US009660942B2

(12) United States Patent
Kumar

(10) Patent No.: US 9,660,942 B2
(45) Date of Patent: May 23, 2017

(54) AUTOMATIC BUFFER SIZING FOR OPTIMAL NETWORK-ON-CHIP DESIGN

(71) Applicant: NetSpeed Systems, San Jose, CA (US)

(72) Inventor: Sailesh Kumar, San Jose, CA (US)

(73) Assignee: NetSpeed Systems, San Jose, CA (US)

( * ) Notice: Subject to any disclaimer, the term of this patent is extended or adjusted under 35 U.S.C. 154(b) by 61 days.

(21) Appl. No.: 14/612,807

(22) Filed: Feb. 3, 2015

(65) Prior Publication Data
US 2017/0063734 A1 Mar. 2, 2017

(51) Int. Cl.
*H04J 3/16* (2006.01)
*H04L 12/861* (2013.01)
*H04L 12/933* (2013.01)

(52) U.S. Cl.
CPC ........ *H04L 49/9005* (2013.01); *H04L 49/109* (2013.01)

(58) Field of Classification Search
None
See application file for complete search history.

(56) References Cited

U.S. PATENT DOCUMENTS

| | | |
|---|---|---|
| 4,933,933 A | 6/1990 | Dally et al. |
| 5,355,455 A | 10/1994 | Hilgendorf et al. |
| 5,432,785 A | 7/1995 | Ahmed et al. |
| 5,764,740 A | 6/1998 | Holender |
| 5,991,308 A | 11/1999 | Fuhrmann et al. |
| 6,003,029 A | 12/1999 | Agrawal et al. |
| 6,101,181 A | 8/2000 | Passint et al. |
| 6,108,739 A | 8/2000 | James et al. |
| 6,249,902 B1 | 6/2001 | Igusa et al. |
| 6,314,487 B1 | 11/2001 | Hahn et al. |

(Continued)

FOREIGN PATENT DOCUMENTS

| | | |
|---|---|---|
| CN | 103684961 A | 3/2014 |
| WO | 2014059024 A1 | 4/2014 |

OTHER PUBLICATIONS

Abts, D., et al., Age-Based Packet Arbitration in Large-Radix k-ary n-cubes, Supercomputing 2007 (SC07), Nov. 10-16, 2007, 11 pgs.

(Continued)

*Primary Examiner* — Otis L Thompson, Jr.
(74) *Attorney, Agent, or Firm* — Procopio, Cory, Hargreaves & Savitch LLP

(57) ABSTRACT

The present disclosure relates to automatic sizing of NoC channel buffers of one or more virtual channels to optimize NoC design, SoC design, and to meet defined performance objectives. The present disclosure further relates to a NoC element such as a router or a bridge having input ports associated with input virtual channels, and output ports associated with output virtual channels, wherein, aspects of the present disclosure enable sizing of any or a combination of the width of the input virtual channel(s), width of the output virtual channel(s), buffer(s) associated with input virtual channels, and buffer(s) associated with output virtual channels. In another aspect, the sizing can be performed based on one or a combination of defined performance objectives, throughputs of the input virtual channels, and throughputs of the output virtual channels, load characteristics, bandwidth characteristics of each input/output channel, among other like parameters.

18 Claims, 14 Drawing Sheets

(56) References Cited

U.S. PATENT DOCUMENTS

| | | |
|---|---|---|
| 6,415,282 B1 | 7/2002 | Mukherjea et al. |
| 6,925,627 B1 | 8/2005 | Longway et al. |
| 7,065,730 B2 | 6/2006 | Alpert et al. |
| 7,318,214 B1 | 1/2008 | Prasad et al. |
| 7,590,959 B2 | 9/2009 | Tanaka |
| 7,724,735 B2 | 5/2010 | Locatelli et al. |
| 7,725,859 B1 | 5/2010 | Lenahan et al. |
| 7,808,968 B1 | 10/2010 | Kalmanek, Jr. et al. |
| 7,917,885 B2 | 3/2011 | Becker |
| 7,957,381 B2 | 6/2011 | Clermidy et al. |
| 8,050,256 B1 | 11/2011 | Bao et al. |
| 8,059,551 B2 | 11/2011 | Milliken |
| 8,099,757 B2 | 1/2012 | Riedle et al. |
| 8,136,071 B2 | 3/2012 | Solomon |
| 8,203,938 B2 | 6/2012 | Gibbings |
| 8,281,297 B2 | 10/2012 | Dasu et al. |
| 8,312,402 B1 | 11/2012 | Okhmatovski et al. |
| 8,412,795 B2 | 4/2013 | Mangano et al. |
| 8,448,102 B2 | 5/2013 | Kornachuk et al. |
| 8,490,110 B2 | 7/2013 | Hoover et al. |
| 8,492,886 B2 | 7/2013 | Or-Bach et al. |
| 8,541,819 B1 | 9/2013 | Or-Bach et al. |
| 8,543,964 B2 | 9/2013 | Ge et al. |
| 8,601,423 B1 | 12/2013 | Philip et al. |
| 8,635,577 B2 | 1/2014 | Kazda et al. |
| 8,667,439 B1 | 3/2014 | Kumar et al. |
| 8,705,368 B1 | 4/2014 | Abts et al. |
| 8,717,875 B2 | 5/2014 | Bejerano et al. |
| 8,738,860 B1 | 5/2014 | Griffin et al. |
| 8,885,510 B2* | 11/2014 | Kumar .................. H04L 49/109 370/252 |
| 2002/0071392 A1 | 6/2002 | Grover et al. |
| 2002/0073380 A1 | 6/2002 | Cooke et al. |
| 2002/0083159 A1 | 6/2002 | Ward et al. |
| 2002/0095430 A1 | 7/2002 | Egilsson et al. |
| 2004/0216072 A1 | 10/2004 | Alpert et al. |
| 2005/0147081 A1 | 7/2005 | Acharya et al. |
| 2005/0203988 A1 | 9/2005 | Nollet et al. |
| 2006/0161875 A1 | 7/2006 | Rhee |
| 2006/0209846 A1 | 9/2006 | Clermidy et al. |
| 2006/0268909 A1 | 11/2006 | Langevin et al. |
| 2007/0088537 A1 | 4/2007 | Lertora et al. |
| 2007/0118320 A1 | 5/2007 | Luo et al. |
| 2007/0244676 A1 | 10/2007 | Shang et al. |
| 2007/0256044 A1 | 11/2007 | Coryer et al. |
| 2007/0267680 A1 | 11/2007 | Uchino et al. |
| 2008/0072182 A1 | 3/2008 | He et al. |
| 2008/0120129 A1 | 5/2008 | Seubert et al. |
| 2008/0184259 A1 | 7/2008 | Lesartre et al. |
| 2008/0232387 A1 | 9/2008 | Rijpkema et al. |
| 2009/0046727 A1 | 2/2009 | Towles |
| 2009/0070726 A1 | 3/2009 | Mehrotra et al. |
| 2009/0268677 A1 | 10/2009 | Chou et al. |
| 2009/0313592 A1* | 12/2009 | Murali ................ G06F 17/5045 716/113 |
| 2010/0040162 A1 | 2/2010 | Suehiro |
| 2011/0022754 A1 | 1/2011 | Cidon et al. |
| 2011/0035523 A1 | 2/2011 | Feero et al. |
| 2011/0060831 A1 | 3/2011 | Ishii et al. |
| 2011/0072407 A1 | 3/2011 | Keinert et al. |
| 2011/0103799 A1 | 5/2011 | Shacham et al. |
| 2011/0154282 A1 | 6/2011 | Chang et al. |
| 2011/0191774 A1 | 8/2011 | Hsu et al. |
| 2011/0276937 A1 | 11/2011 | Waller |
| 2012/0022841 A1 | 1/2012 | Appleyard |
| 2012/0023473 A1 | 1/2012 | Brown et al. |
| 2012/0026917 A1 | 2/2012 | Guo et al. |
| 2012/0072635 A1* | 3/2012 | Yoshida ............. H04L 49/3027 710/306 |
| 2012/0099475 A1 | 4/2012 | Tokuoka |
| 2012/0110541 A1 | 5/2012 | Ge et al. |
| 2012/0155250 A1 | 6/2012 | Carney et al. |
| 2013/0028083 A1* | 1/2013 | Yoshida .................. H04L 49/60 370/230 |
| 2013/0028090 A1 | 1/2013 | Yamaguchi et al. |
| 2013/0051397 A1* | 2/2013 | Guo ....................... H04L 45/00 370/400 |
| 2013/0080073 A1 | 3/2013 | de Corral |
| 2013/0103369 A1 | 4/2013 | Huynh et al. |
| 2013/0148506 A1 | 6/2013 | Lea |
| 2013/0151215 A1 | 6/2013 | Mustapha |
| 2013/0159944 A1 | 6/2013 | Uno et al. |
| 2013/0174113 A1* | 7/2013 | Lecler ................. G06F 17/5072 716/122 |
| 2013/0207801 A1 | 8/2013 | Barnes |
| 2013/0219148 A1 | 8/2013 | Chen et al. |
| 2013/0250792 A1* | 9/2013 | Yoshida .............. H04L 49/9036 370/252 |
| 2013/0263068 A1 | 10/2013 | Cho et al. |
| 2013/0311819 A1* | 11/2013 | Ishii ...................... G06F 13/372 713/601 |
| 2013/0326458 A1 | 12/2013 | Kazda et al. |
| 2014/0068132 A1 | 3/2014 | Philip et al. |
| 2014/0092740 A1 | 4/2014 | Wang et al. |
| 2014/0098683 A1 | 4/2014 | Kumar et al. |
| 2014/0115218 A1 | 4/2014 | Philip et al. |
| 2014/0115298 A1 | 4/2014 | Philip et al. |
| 2015/0103822 A1* | 4/2015 | Gianchandani ......... H04L 69/08 370/389 |
| 2015/0109024 A1* | 4/2015 | Abdelfattah ... H03K 19/017581 326/41 |
| 2015/0178435 A1* | 6/2015 | Kumar .................. G06F 17/505 716/114 |

OTHER PUBLICATIONS

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, E., et al., Fairness via Source Throttling: A Configurable and High-Performance Fairness Substrate for Multi-Core Memory Systems, ASPLOS '10, Mar. 13-17, 2010, 12 pgs.

Grot, B., Preemptive Virtual Clock: A Flexible, Efficient, and Cost-Effective QOS Scheme for Networks-on-Chip, Micro '09, December Dec. 16, 2009, 12 pgs.

Grot, B., Kilo-NOC: A Heterogeneous Network-on-Chip Architecture for Scalability and Service Guarantees, ISCA '11, Jun. 4-8, 2011, 12 pgs.

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.

Jiang, N., et al., Performance Implications of Age-Based Allocations in On-Chip Networks, CVA MEMO 129, May 24, 2011, 21 pgs.

Lee, J. W., et al., Globally-Synchronized Frames for Guaranteed Quality-of-Service in On-Chip Networks, 35th IEEE/ ACM International Symposium on Computer Architecture (ISCA), Jun. 2008, 12 pgs.

Lee, M. M., et al., Approximating Age-Based Arbitration in On-Chip Networks, PACT '10, Sep. 11-15, 2010, 2 pgs.

Li, B., et al., CoQoS: Coordinating QoS-Aware Shared Resources in NoC-based SoCs, J. Parallel Distrib. Comput., 71(5), May 2011, 14 pgs.

International Search Report and Written Opinion for PCT/US2013/064140, Jan. 22, 2014, 9 pgs.

International Search Report and Written Opinion for PCT/US2014/012003, Mar. 26, 2014, 9 pgs.

International Search Report and Written Opinion for PCT/US2014/012012, May 14, 2014, 9 pgs.

Ababei, C., et al., Achieving Network on Chip Fault Tolerance by Adaptive Remapping, Parallel & Distributed Processing, 2009, IEEE International Symposium, 4 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

(56) References Cited

OTHER PUBLICATIONS

Gindin, R., et al., NoC-Based FPGA: Architecture and Routing, Proceedings of the First International Symposium on Networks-on-Chip (NOCS'07), May 2007, pp. 253-262.

Yang, J., et al., Homogeneous NoC-based FPGA: The Foundation for Virtual FPGA, 10th IEEE International Conference on Computer and Information Technology (CIT 2010), Jun. 2010, pp. 62-67.

International Search Report and Written Opinion for PCT/US2014/023625, Jul. 10, 2014, 9 pgs.

International Search Report and Written Opinion for PCT/US2014/037902, Sep. 30, 2014, 14 pgs.

International Search Report and Written Opinion for PCT/US2014/048190, Nov. 28, 2014, 11 pgs.

Hestness, J., et al., Netrace: Dependency-Tracking for Efficient Network-on-Chip Experimentation, The University of Texas at Austin, Dept. of Computer Science, May 2011, 20 pgs.

Lin, S., et al., Scalable Connection-Based Flow Control Scheme for Application-Specific Network-on-Chip, The Journal of China Universities of Posts and Telecommunications, Dec. 2011, 18(6), pp. 98-105.

Munirul, H.M., et al., Evaluation of Multiple-Valued Packet Multiplexing Scheme for Network-on-Chip Architecture, Proceedings of the 36th International Symposium on Multiple-Valued Logic (ISMVL '06), 2006, 6 pgs.

Chinese Application No. 201310389131.9 was published as Publication No. CN103684961 on Mar. 26, 2014, and corresponds to U.S. Appl. No. 13/599,559.

* cited by examiner

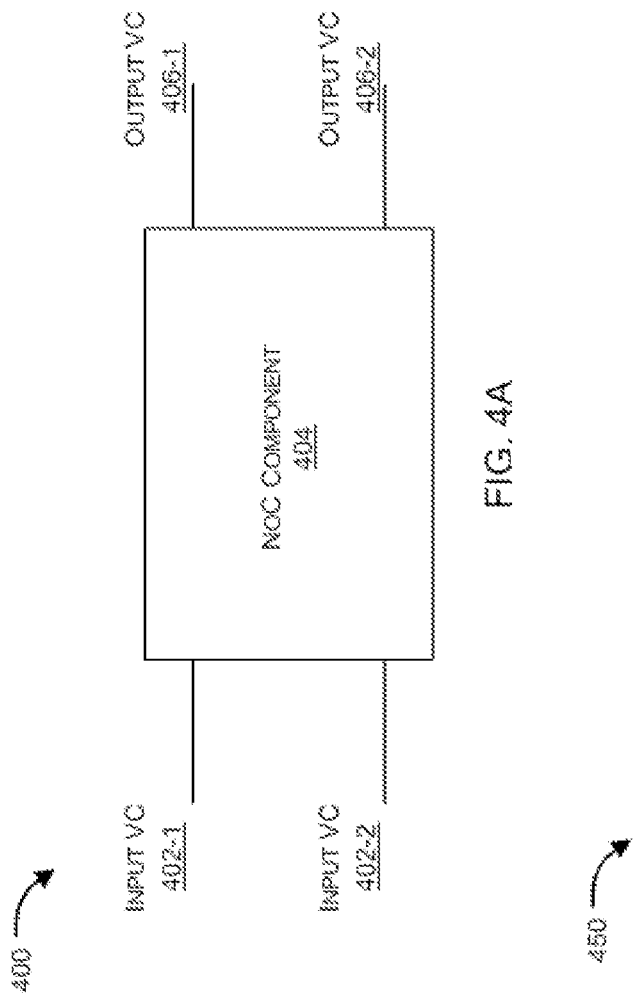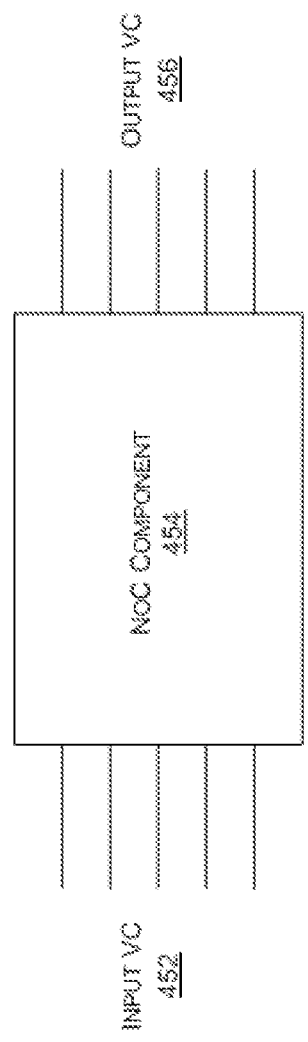
FIG. 4A
FIG. 4B

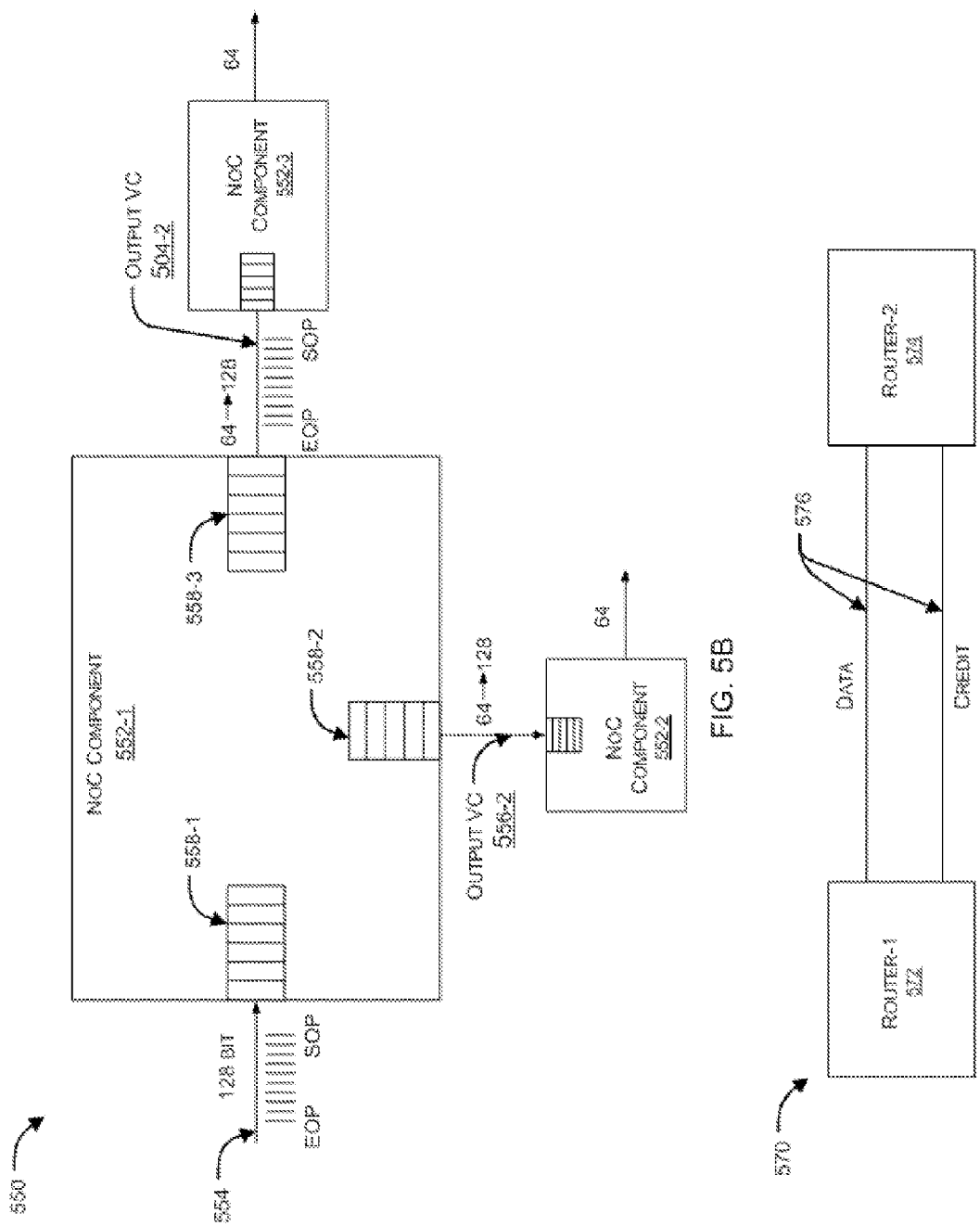

AUTOMATIC BUFFER SIZING FOR OPTIMAL NETWORK-ON-CHIP DESIGN

BACKGROUND

Technical Field

Methods and example implementations described herein are directed to interconnect architecture, and more specifically, to buffers within a Network on Chip (NoC) system interconnect architecture for optimal NoC and system design.

Related Art

The number of components on a chip is rapidly growing due to increasing levels of integration, system complexity and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both SoC and CMP systems, the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links that denote connectivity and direction of data flow within the SoC and the NoC.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components which are interconnected using a NoC. Terms 'routers' and 'nodes' will also be used interchangeably. Without loss of generalization, the system with multiple interconnected components will itself be referred to as a 'multi-core system'.

There are several topologies in which the routers can connect to one another to create the system network. Bi-directional rings (as shown in FIG. 1(a)), 2-D (two dimensional) mesh (as shown in FIG. 1(b)) and 2-D Taurus (as shown in FIG. 1(c)) are examples of topologies in the related art. Mesh and Taurus can also be extended to 2.5-D (two and half dimensional) or 3-D (three dimensional) organizations. FIG. 1(d) shows a 3D mesh NoC, where there are three layers of 3x3 2D mesh NoC shown over each other. The NoC routers have up to two additional ports, one connecting to a router in the higher layer, and another connecting to a router in the lower layer. Router 111 in the middle layer of the example has both ports used, one connecting to the router at the top layer and another connecting to the router at the bottom layer. Routers 110 and 112 are at the bottom and top mesh layers respectively, therefore they have only the upper facing port 113 and the lower facing port 114 respectively connected.

Packets are message transport units for intercommunication between various components. Routing involves identifying a path composed of a set of routers and physical links of the network over which packets are sent from a source to a destination. Components are connected to one or multiple ports of one or multiple routers; with each such port having a unique ID. Packets carry the destination's router and port ID for use by the intermediate routers to route the packet to the destination component.

Examples of routing techniques include deterministic routing, which involves choosing the same path from A to B for every packet. This form of routing is independent from the state of the network and does not load balance across path diversities, which might exist in the underlying network. However, such deterministic routing may implemented in hardware, maintains packet ordering and may be rendered free of network level deadlocks. For example, shortest path routing may minimize the latency as such routing reduces the number of hops from the source to the destination(s) or the cost of routing the packet from the source to the destination(s), wherein the cost of routing depends on the bandwidth available. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing may be minimal turn and shortest path routing.

FIG. 2(a) pictorially illustrates an example of XY routing in a two dimensional mesh. More specifically, FIG. 2(a) illustrates XY routing from node '34' to node '00'. In the example of FIG. 2(a), each component is connected to only one port of one router. A packet is first routed over the x-axis till the packet reaches node '04' where the x-coordinate of the node is the same as the x-coordinate of the destination node. The packet is next routed over the y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there may exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

The physical channels are time sliced into a number of independent logical channels called virtual channels (VCs). VCs provide multiple independent paths to route packets, however they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

NoC interconnects may employ wormhole routing, wherein, a large message or packet is broken into small pieces known as flits (also referred to as flow control digits). The first flit is the header flit, which holds information about this packet's route and key message level info along with payload data and sets up the routing behavior for all subsequent flits associated with the message. Optionally, one or more body flits follows the head flit, containing the remaining payload of data. The final flit is the tail flit, which in addition to containing the last payload also performs some bookkeeping to close the connection for the message. In wormhole flow control, virtual channels are often implemented.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies, and various channels may have different widths based on the bandwidth requirement at the channel. The bandwidth requirement at a channel is determined by the flows that traverse over the channel and their bandwidth values. Flows traversing over various NoC channels are affected by the routes taken by various flows. In a mesh or Taurus NoC, there may exist multiple route paths of equal length or number of hops between any pair of source and destination nodes. For example, in FIG. 2(b), in addition to the standard XY route between nodes 34 and 00, there are additional routes available, such as YX route 203 or a multi-turn route 202 that makes more than one turn from source to destination.

In a NoC with statically allocated routes for various traffic slows, the load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Additionally, wider physical channels may not help in achieving higher bandwidth if messages are short. For example, if a packet is a single flit packet with a 64-bit width, then no matter how wide a channel is, the channel will only be able to carry 64 bits per cycle of data if all packets over the channel are similar. Thus, a channel width is also limited by the message size in the NoC. Due to these limitations on the maximum NoC channel width, a channel may not have enough bandwidth in spite of balancing the routes.

To address the above bandwidth concern, multiple parallel physical NoCs may be used. Each NoC may be called a layer, thus creating a multi-layer NoC architecture. Hosts inject a message on a NoC layer; the message is then routed to the destination on the NoC layer, where it is delivered from the NoC layer to the host. Thus, each layer operates more or less independently from each other, and interactions between layers may only occur during the injection and ejection times. FIG. 3(a) illustrates a two layer NoC. Here the two NoC layers are shown adjacent to each other on the left and right, with the hosts connected to the NoC replicated in both left and right diagrams. A host is connected to two routers in this example—a router in the first layer shown as R1, and a router is the second layer shown as R2. In this example, the multi-layer NoC is different from the 3D NoC, i.e. multiple layers are on a single silicon die and are used to meet the high bandwidth demands of the communication between hosts on the same silicon die. Messages do not go from one layer to another. For purposes of clarity, the present application will utilize such a horizontal left and right illustration for multi-layer NoC to differentiate from the 3D NoCs, which are illustrated by drawing the NoCs vertically over each other.

In FIG. 3(b), a host connected to a router from each layer, R1 and R2 respectively, is illustrated. Each router is connected to other routers in its layer using directional ports 301, and is connected to the host using injection and ejection ports 302. A bridge-logic 303 may sit between the host and the two NoC layers to determine the NoC layer for an outgoing message and sends the message from host to the NoC layer, and also perform the arbitration and multiplexing between incoming messages from the two NoC layers and delivers them to the host.

In a multi-layer NoC, the number of layers needed may depend upon a number of factors such as the aggregate bandwidth requirement of all traffic flows in the system, the routes that are used by various flows, message size distribution, maximum channel width, etc. Once the number of NoC layers in NoC interconnect is determined in a design, different messages and traffic flows may be routed over different NoC layers. Additionally, one may design NoC interconnects such that different layers have different topologies in number of routers, channels and connectivity. The channels in different layers may have different widths based on the flows that traverse over the channel and their bandwidth requirements.

In a NoC interconnect, if the traffic profile is not uniform and there is a certain amount of heterogeneity (e.g., certain hosts talking to each other more frequently than the others), the interconnect performance may depend on the NoC topology and where various hosts are placed in the topology with respect to each other and to what routers they are connected to. For example, if two hosts talk to each other frequently and require higher bandwidth than other interconnects, then they should be placed next to each other. This will reduce the latency for this communication which thereby reduces the global average latency, as well as reduce the number of router nodes and links over which the higher bandwidth of this communication must be provisioned.

As the number of chip components are growing, and NoC and SoC are being configured to support varying traffic profiles that have randomness and burstiness, it is desired to configure NoC channels and/or buffers that efficiently support such varying traffic characteristics/specification/conditions to minimize the impact of such varying conditions on experience, congestion, among other performance parameters.

Therefore, there is need for a method, system, and non-transitory computer implementation for sizing channel and/or buffer attributes such as channel width, channel depth, and sizing of buffers of channels so as to get an optimal NoC and system design that meet performance objectives of SoC and/or NoC.

SUMMARY

Methods, non-transitory computer readable mediums, and systems are described for automatically sizing NoC channel buffers of one or more virtual channels in order to optimize the NoC design, SoC design, and to meet defined performance objectives. Methods, non-transitory computer readable mediums, and systems are described for a NoC element such as a router or a bridge having input ports associated with input virtual channels, and output ports associated with output virtual channels, wherein, in an aspect, the proposed method enables sizing of any or a combination of the width of the input virtual channel(s), width of the output virtual channel(s), buffer(s) associated with input virtual channels, and buffer(s) associated with output virtual channels. In another aspect, the sizing can be performed based on one or a combination of defined performance objectives, throughputs of the input virtual channels, and throughputs of the output virtual channels, load characteristics, bandwidth characteristics of each input/output channel, among other like parameters.

Aspects of the present disclosure provide a method for computing the bandwidth for a given NoC channel, say in terms of flits per cycle, and then sizing the width of the NoC channel based on the computed width, wherein, for instance, in case the load on the channel is computed to be greater than 1.0, width of the channel can be increased to bring it to less than or equal to 1.0. In an example embodiment, method of the present disclosure can also enable provisioning of additional bandwidth in order to cater for randomness in traffic and prevent loss of efficiency.

Aspects of the proposed method can further include oversizing of one or more channels associated with a NoC element, such as a router, in order to prevent arbitration conflict, wherein the extent of oversizing can be determined based on one or a combination of traffic specification, traffic distribution, input/output port configuration, virtual channel configuration, router/NoC element design, efficiency of router/NoC element, efficient of channel, among other parameters/attributes. Oversizing can further be configured to cater randomness and burstiness in the traffic flow. In another aspect, oversizing of one or more channels can also be defined based on user specific/configured/defined efficiency levels.

Aspects of the proposed method can further include changing the width of one or more input and/or output virtual channels depending on the width of their corresponding channels. For instance, in case the incoming channels of a given router have a capacity of 64 bits/cycle and the output channel has a capacity of 128 bits/cycle, size of the incoming channels can be automatically changed to have a capacity of 128 bits/cycle. Similarly, in case the input channels of a given router have a capacity of 128 bits/cycle, and the output channel has a capacity of 64 bits/cycle, size of the output channel can be automatically changed to have a capacity of 128 bits/cycle and accommodate traffic from both the input ports with minimal efficiency loss. In an alternate embodiment, in case the input channels of a given router have a capacity of 64 bits/cycle, and the output channel has a capacity of 128 bits/cycle, buffer size of the input channels can be increased to accommodate/buffer the complete packet (from start of packet (SOP) to end of packet (EOP)) before the same is transmitted in a single go to the 128 bits/cycle output channel. Such a router configuration can be marked and/or rendered as a store and forward router.

Aspects of the present system further include means for sizing a channel based on flow control, wherein, for instance, in case it is determined by the proposed system that the router sending a request works at a different clock frequency (C1) when compared with the clock frequency (C2) of the receiving router, as the router times are different/increase, buffer size of the receiving buffers can be controlled/managed to enable efficient throughput. In another example aspect, in case the proposed system determines that the read frequency is less than write frequency, then there exists no need to maintain full throughput by means of additional buffer size as the read throughput is more than the write throughput and the drain rate at the first-input-first-output (FIFO) buffer would be lower. On the other hand, in case the read frequency is more than or equal to the write frequency, the buffer (FIFO-based) size can be deepened.

Aspects of the present system further include sizing of the buffers based on bandwidth requirement, project load conditions, expected randomness/burstiness, among other like parameters. For instance, system of the present disclosure can be configured to compute the bandwidth requirement of each virtual channel in terms of expected number of flits of data, based on which the system can reduce the size of the FIFO buffer, such that if the bandwidth requirement is less than 1 per cycle, the system can reduce the FIFO buffer accordingly and maintain the desired throughput.

BRIEF DESCRIPTION OF THE DRAWINGS

FIG. 4A and FIG. 4B illustrates example NoC components having multiple input and output ports connecting the NoC component with other NoC components using virtual channels that may cause loss of efficiency due to NoC component (router) arbitration.

FIG. 5A and FIG. 5B illustrates example NoC components that can use automatic sizing of channels and buffer in accordance with an embodiment of the present disclosure.

FIG. 5C illustrates example NoC components wherein the size of the buffer and data forwarding can be based on flow control in accordance with an embodiment of the present disclosure.

DETAILED DESCRIPTION

Figure 1A:
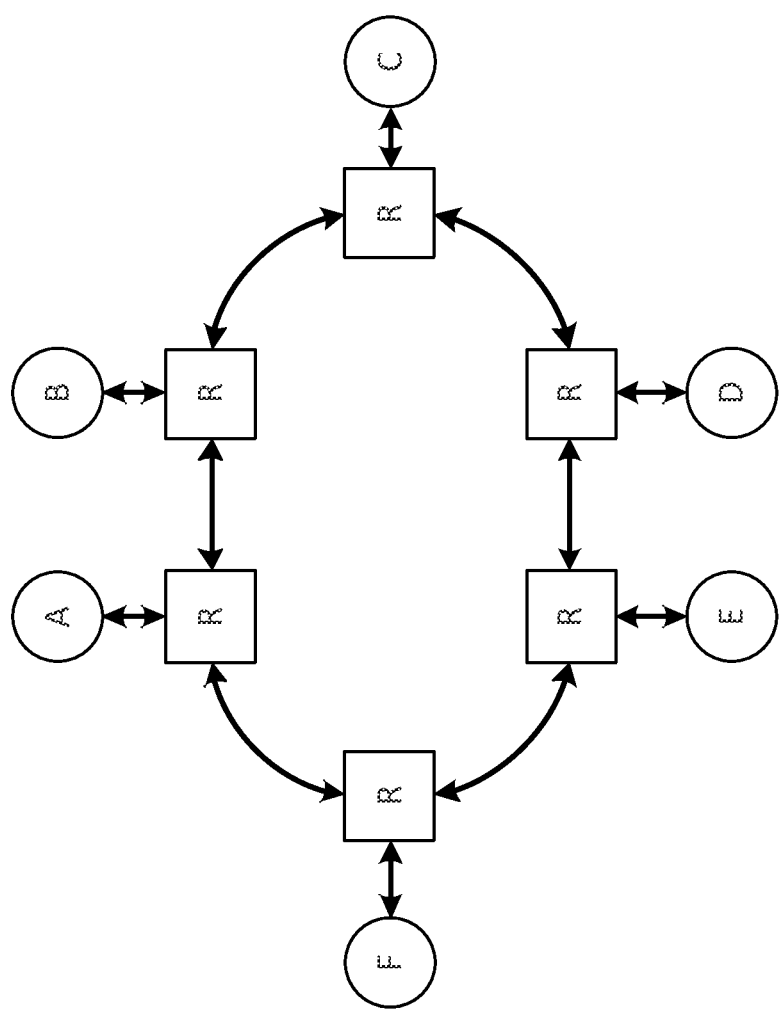
FIGS. 1(a), 1(b) 1(c) and 1(d) illustrate examples of Bidirectional ring, 2D Mesh, 2D Taurus, and 3D Mesh NoC Topologies.
Figure 1B:
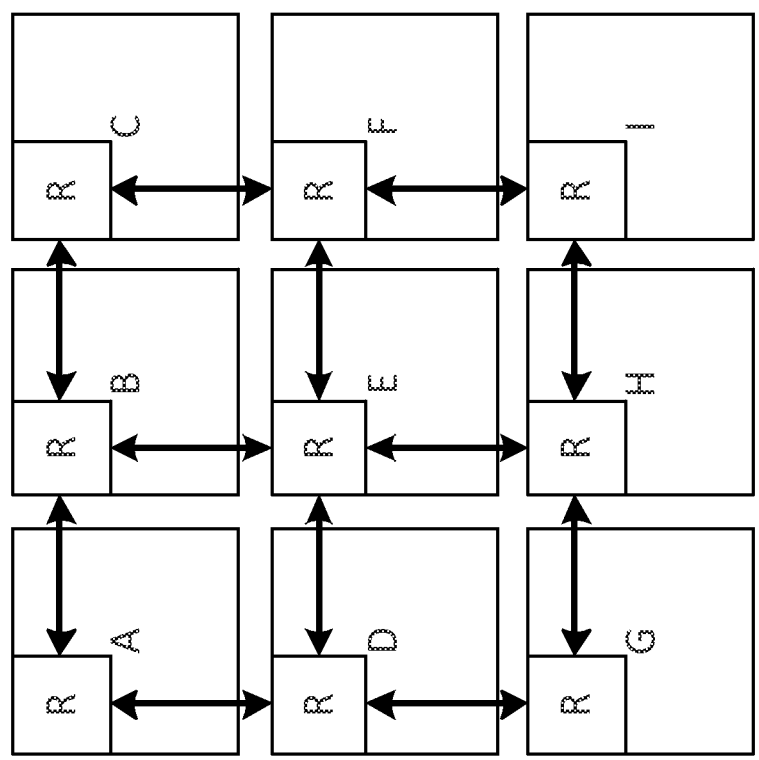
Figure 1C:
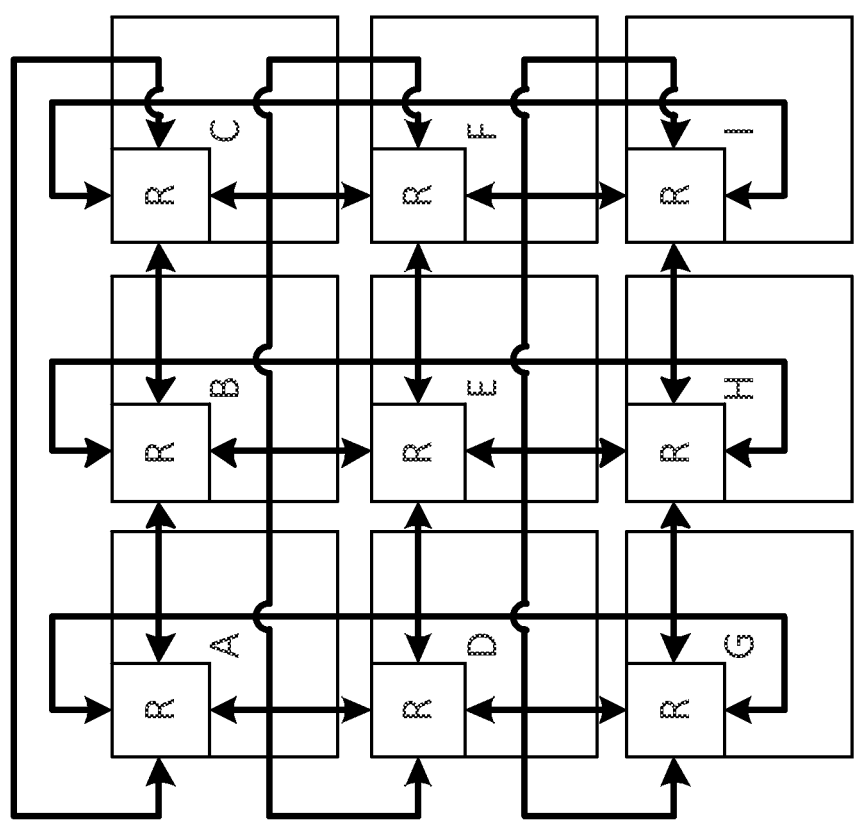
Figure 1D:
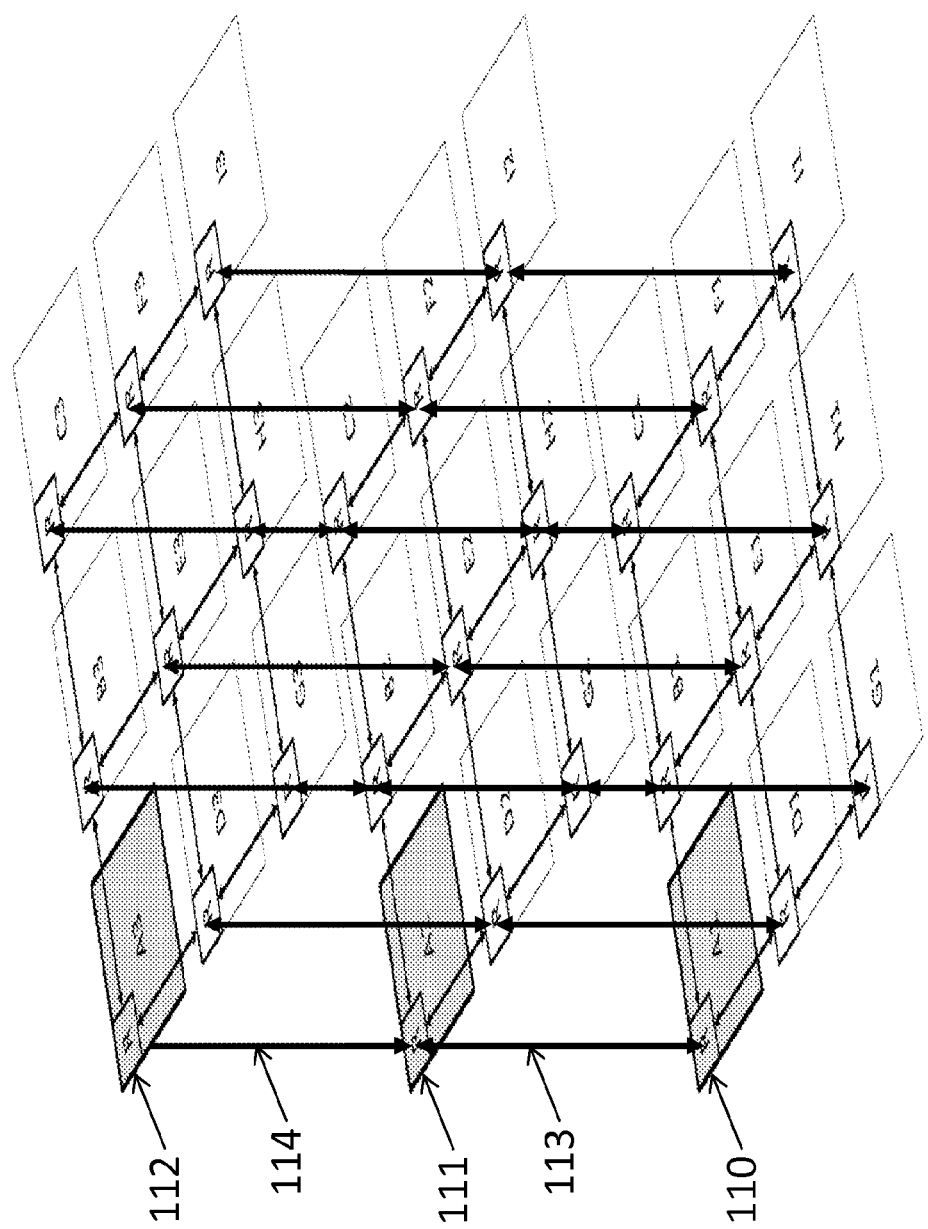
Figure 2A:
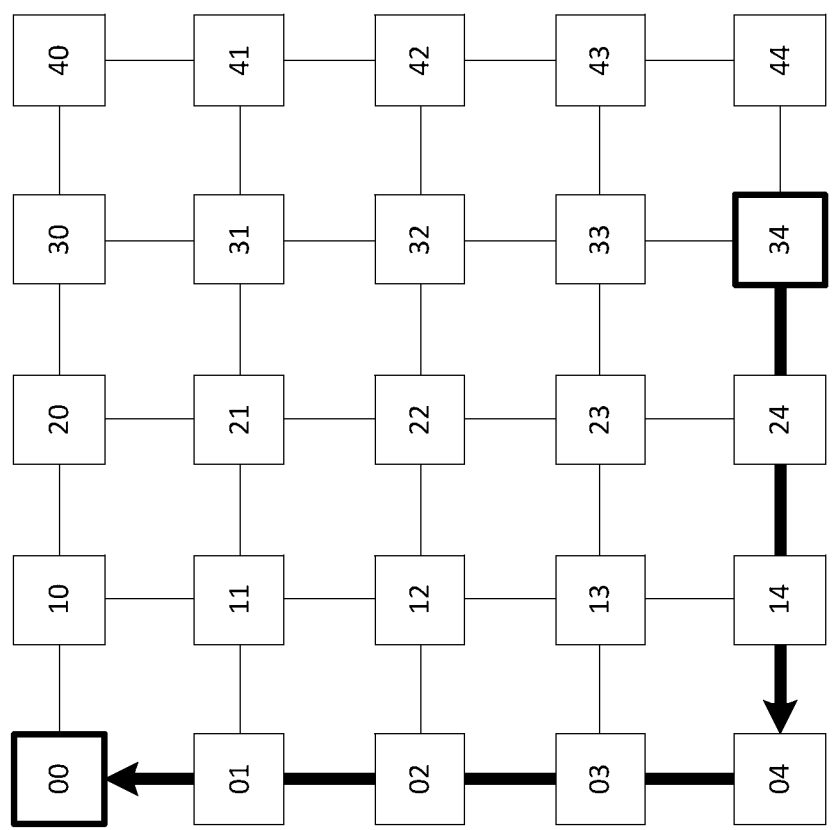
FIG. 2(a) illustrates an example of XY routing in a related art two dimensional mesh.
Figure 2B:
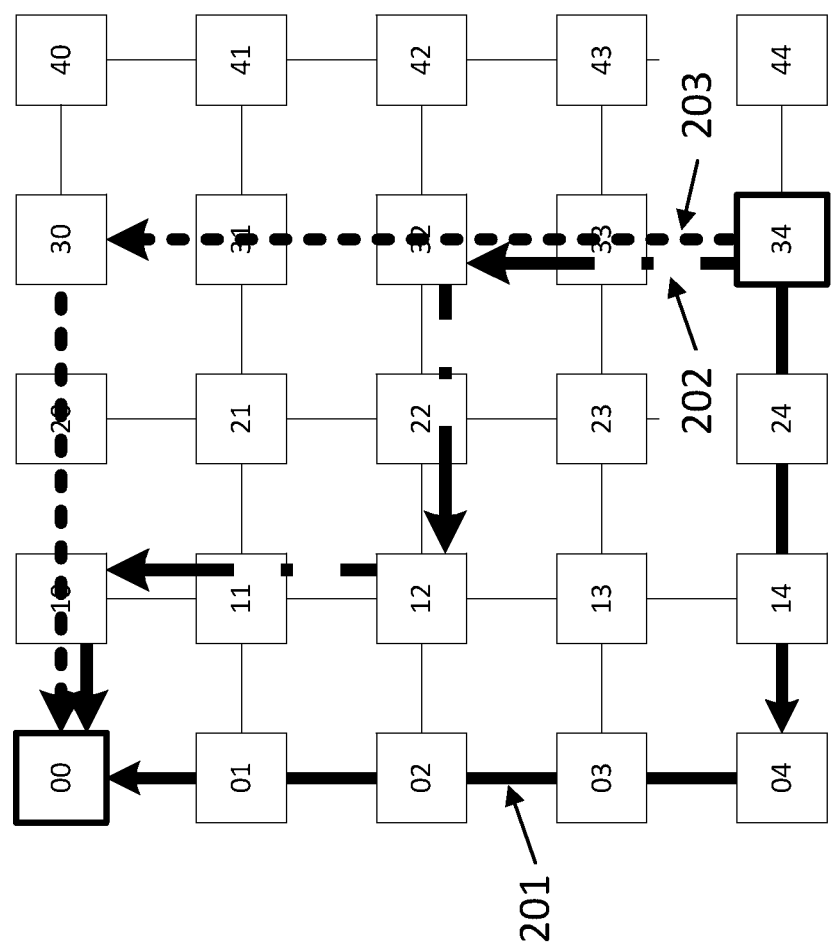
FIG. 2(b) illustrates three different routes between a source and destination nodes.
Figure 3A:
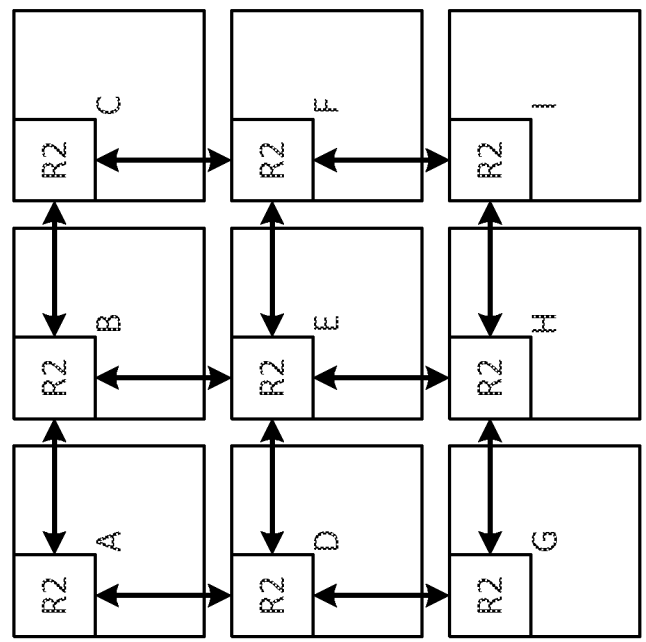
FIG. 3(a) illustrates an example of a related art two layer NoC interconnect.
Figure 3A:
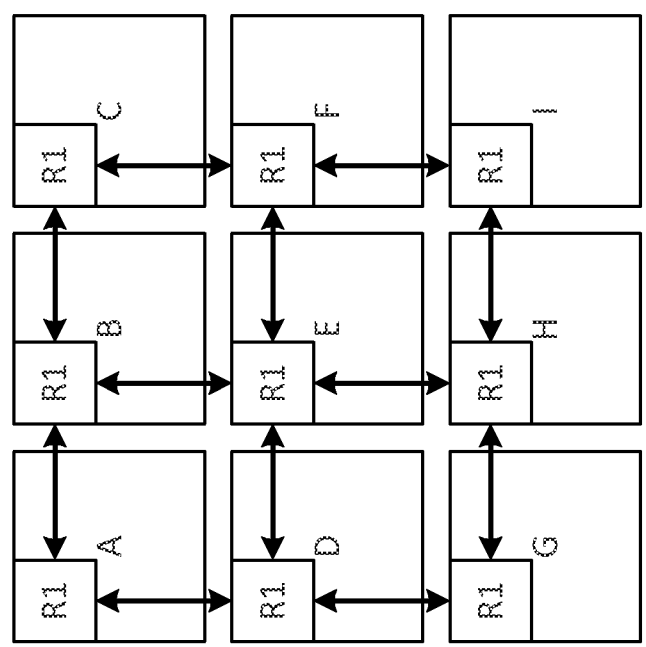
Figure 3B:
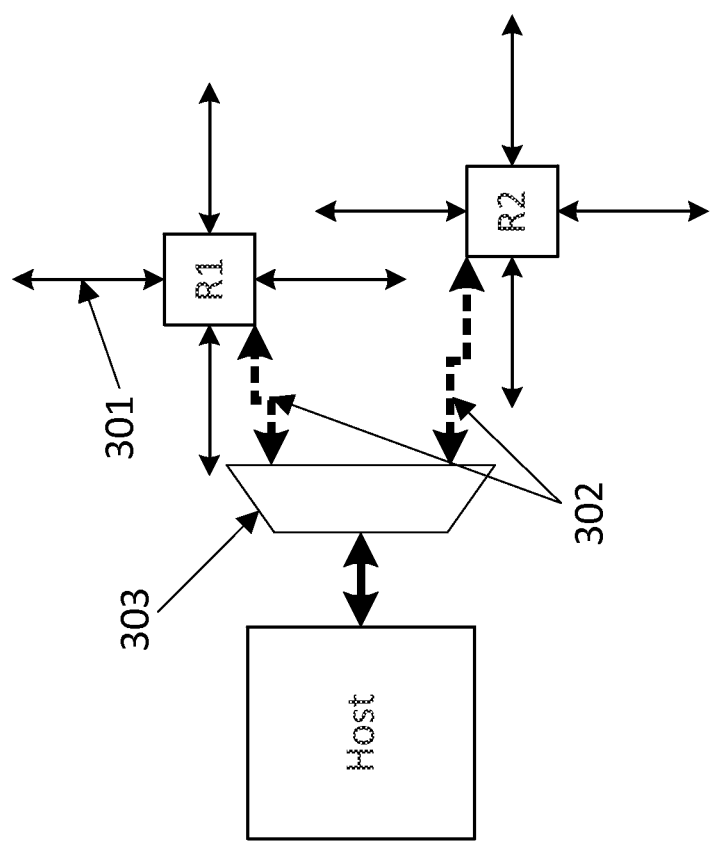
FIG. 3(b) illustrates the related art bridge logic between host and multiple NoC layers.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

Example implementations may involve power management sequences and automatic power management systems. Examples and description of such sequences and systems are described in U.S. application Ser. No. 14/495,689 (filed Sep. 24, 2014) and Ser. No. 14/498,907 (filed Sep. 26, 2014), the disclosures of which are hereby incorporated by reference in their entirety for all purposes.

Methods, non-transitory computer readable mediums, and systems are described for automatically sizing NoC channel buffers of one or more virtual channels in order to optimize the NoC design, SoC design, and to meet defined performance objectives. Methods, non-transitory computer readable mediums, and systems are described for a NoC element such as a router or a bridge having input ports associated with one or more input virtual channels, and output ports associated with one or more output virtual channels, wherein, in an aspect, the proposed method enables sizing of any or a combination of the width of the input virtual channel(s), width of the output virtual channel(s), buffer(s) associated with input virtual channels, and buffer(s) associated with output virtual channels. In another aspect, the sizing can be performed based on one or a combination of defined performance objectives, throughputs of the one or more input virtual channels, throughputs of the output virtual channels, load characteristics, bandwidth characteristics of each input/output channel, among other like parameters.

Aspects of the present disclosure provide a method for computing the bandwidth for a given NoC channel, say in terms of flits per cycle, and then sizing the width of the NoC channel based on the computed width, wherein, for instance, in case the load on the channel is computed to be greater than 1.0, width of the channel can be increased to bring it to less than or equal to 1.0. In an example embodiment, method of the present disclosure can also enable provisioning of additional bandwidth in order to cater for randomness in traffic and prevent loss of efficiency.

Aspects of the proposed method can further include oversizing of one or more channels associated with a NoC element, such as a router, in order to prevent arbitration conflict, wherein the extent of oversizing can be determined based on one or a combination of traffic specification, traffic distribution, input/output port configuration, virtual channel configuration, router/NoC element design, efficiency of router/NoC element, efficient of channel, among other parameters/attributes. Oversizing can further be configured to cater randomness and burstiness in the traffic flow. In another aspect, oversizing of one or more channels can also be defined based on user specific/configured/defined efficiency levels.

Aspects of the proposed method can further include changing the width of one or more input and/or output virtual channels depending on the width of their corresponding channels. For instance, in case the incoming channels of a given router have a capacity of 64 bits/cycle and the output channel has a capacity of 128 bits/cycle, size of the incoming channels can be automatically changed to have a capacity of 128 bits/cycle. Similarly, in case the input channels of a given router have a capacity of 128 bits/cycle, and the output channel has a capacity of 64 bits/cycle, size of the output channel can be automatically changed to have a capacity of 128 bits/cycle and accommodate traffic from both the input ports with minimal efficiency loss. In an alternate embodiment, in case the input channels of a given router have a capacity of 64 bits/cycle, and the output channel has a capacity of 128 bits/cycle, buffer size of the input channels can be increased to accommodate/buffer the complete packet (from start of packet (SOP) to end of packet (EOP)) before the same is transmitted in a single go to the 128 bits/cycle output channel. Such a router configuration can be marked and/or rendered as a store and forward router.

Aspects of the present system further include means for sizing a channel based on flow control, wherein, for instance, in case it is determined by the proposed system that the router sending a request works at a different clock frequency (C1) when compared with the clock frequency (C2) of the receiving router, as the router times are different/increase, buffer size of the receiving buffers can be controlled/managed to enable efficient throughput. In another example aspect, in case the proposed system determines that the read frequency is less than write frequency, then there exists no need to maintain full throughput by means of additional buffer size as the read throughput is more than the write throughput and the drain rate at the first-input-first-output (FIFO) buffer would be lower. On the other hand, in case the read frequency is more than or equal to the write frequency, the buffer (FIFO-based) size can be deepened.

Aspects of the present system further include sizing of the buffers based on bandwidth requirement, project load conditions, expected randomness/burstiness, among other like parameters. For instance, system of the present disclosure can be configured to compute the bandwidth requirement of each virtual channel in terms of expected number of flits of data, based on which the system can reduce the size of the FIFO buffer, such that if the bandwidth requirement is less than 1 per cycle, the system can reduce the FIFO buffer accordingly and maintain the desired throughput.

Aspects of the present disclosure are directed to methods, non-transitory computer readable mediums, and systems for sizing the depth of input virtual channel and/or depth of output virtual channel based on one or more performance objectives, throughputs of the input virtual channels, and throughout of the output virtual channels. According an example embodiment, throughput of the input virtual channels and throughput of the output virtual channels can be based on or can be derived from one or more of clock frequencies of channels, channel width, rate of traffic, and given traffic specification of the NoC and SoC. According to another example embodiment, the performance objective can be based on one or a combination of rate of traffic, message size, distribution of message size or channel width, channel clock frequency, arbitration efficiency of the NoC components, traffic burstiness, user-specified over provisioning, among other like parameters. According to yet another example embodiment, buffer size can be adjusted based on one or a combination of a defined performance objective, packet size, input/output message sizes, and input/ output message rates, flow control round trip time between a transmitting hardware element and a receiving hardware element, frequency of a transmitting hardware element and a receiving hardware element, among other like parameters.

In an example implementation, sizing of a NoC channel can include increasing/decreasing the width of the channel based on the bandwidth/load requirement, wherein the bandwidth/load requirement can be calculated based on one or a combination of flows on the channel, message sizes of the flows, distribution of various messages, existing width of the channel, clock frequency of the channel, among other appropriate parameters. In an aspect, bandwidth requirement can be computed in terms of flits per cycle of the channel, based on which width of the channel can be changed (increased or decreased). In an instance, in case the bandwidth (flits/cycle) is less than 1, the width may be kept the same or can be decreased, whereas in case the bandwidth is more than 1, the channel can be interpreted as being overloaded and then width of the channel can be increased such that the bandwidth is reduced to 1 or less than 1.

According to one embodiment, buffer size of a buffer associated with the input virtual channel can be adjusted based on the performance objective and the throughput of at least one of the input virtual channel and output virtual channel. According to another embodiment, buffer size of a buffer also be associated with the output virtual channel can be adjusted based on the performance objective and the throughput of the at least one of the output virtual channel and input virtual channel.

In an exemplary embodiment, extra bandwidth provisioning can also be incorporated so as to account for randomness of the traffic and in order to support burstiness in the behavior of the traffic such that the efficiency of NoC is not compromised. In an instance, while sizing the width of the channel, burstiness behavior and/or randomness of the traffic can be accounted by extra bandwidth provisioning. For instance, extra bandwidth provisioning of x % can be done such that the overload load can be 1.0-x %.

FIGS. 4A and 4B illustrate an example NoC component 404 having multiple input and output ports connecting the NoC component 404 with other NoC components using virtual channels, which may cause loss of efficiency due to NoC component (router) arbitration. As shown in the example illustration of FIG. 4A, NoC element 404 such as a router 404 can be operatively coupled with two input channels 402-1 and 402-2, collectively and interchangeably referred hereinafter as input channels 402, and two output channels 406-1 and 406-2, collectively and interchangeably referred hereinafter as output channels 406. The NoC component 404 can, for instance, be an on-chip router having two input ports at 402 and two output ports at 406. In an implementation, load on the output channel may be acceptable and optimal when, say the input channel 402-1 sends traffic to output channel 406-1, and the input channel 402-2 sends traffic to the output channel 406-2. However, when the channel 402-1 also starts sending traffic to output channel 406-2, and/or the channel 402-2 starts sending traffic to output channel 406-1 then due to conflicts during router arbitration, congestion can take place at the router channels. Based on traffic pattern, such conflicts during router arbitration can cause loss of efficiency, wherein, for instance, output channel 406-1 can process traffic from input channel 402-1 with full efficiency (100%) and process traffic from input channel 402-2 with half efficiency (50%), making the overall/net efficiency of the output channel to be 75%. This problem is even further aggravated in case of more number of input and output ports, wherein, as shown in FIG. 4B, NoC component 454 has five input ports 452 and five output ports 456, in which case, the efficiency loss on ports other than the one port that is intended to directly process traffic from a given input port is reduced by a factor of 1-1/e, wherein e is the efficiency. The value of efficient e may depend upon the traffic pattern and number of virtual channels, and message sizes. In order to handle load and bandwidth requirements in such a situation, efficiency of router and/or each of its port can be computed, based on this input/output channels can be oversized automatically to compensate for the efficiency loss. Furthermore, in other words, load efficiency at each channel can be computed and sizing can then be performed to compensate for the loss, wherein, in addition, if desired, extra bandwidth can also be provisioned for during oversizing to meet additional unknown loss in efficiency for pathological traffic patterns and burstiness. According to one embodiment, instead of sizing one or more given input/output channels, additional virtual channels can also be incorporated in order to improve efficiency of the NoC architecture.

Figure 5A:
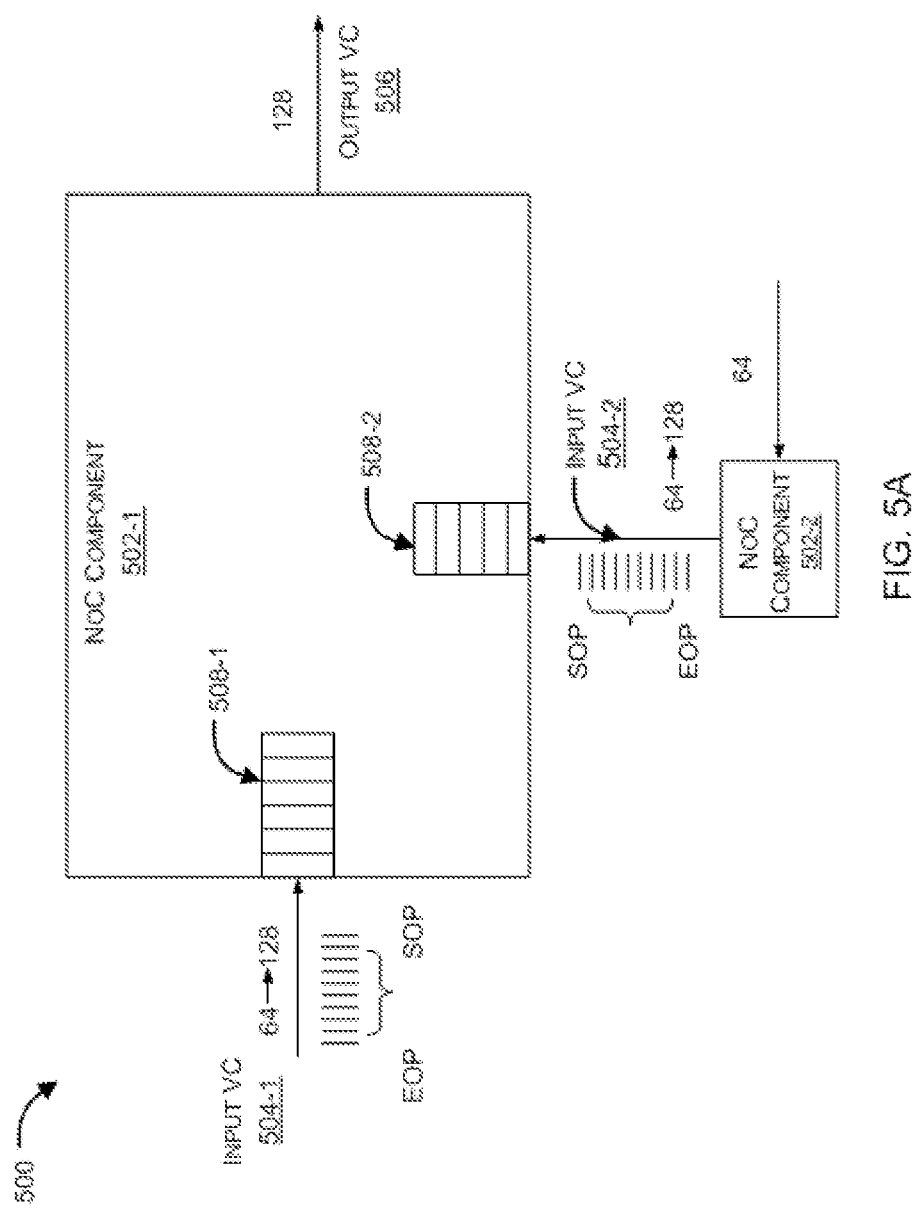

FIGS. 5A and 5B illustrate example NoC components that can use automatic sizing of channels and/or buffers in accordance with an embodiment of the present disclosure. FIG. 5A illustrates an example NoC component 502-1 that may have two input virtual channels VC 504-1 and VC 504-2, each of 64 bits width, collectively and interchangeably referred as input VCs 504, and an output virtual channel VC 506 of 128 bits width, that is wider than the two input VCs 504. An embodiment of the present disclosure is targeted for NoC components that may not multiplex packets received at different input VCs 504 to the output VCs 506 due to various reasons. When a NoC component 502-1 receives packets at two input channels VC 504-1 and VC 504-2, it can use routing arbitration method to schedule packets to be forwarded to the output VC 506 and uses a locking mechanism that forwards packets/FLITs received from one input channel say VC 504-1, and blocks packets/FLITs received from second input channel say VC 504-2. In such scenarios, NoC component 502-1 can lock the output VC 506 for a limited time, for example, for one to two cycles or for a time period that ensures that all the FLITs of scheduled packets are forwarded. During the entire locking period, the period an input VC has locked the output VC for full transmission of all flits of a packet, the throughput at the 128-bit wide output VC will only be 50%, or it will observe a flit every other clock cycle, because input VC width is 64-bit and it can only supply packet at 64-bits/cycle. Due to implementation of such locking mechanism, it can be observed that even though the size of the output VC 506 (128 bits) is equal to that of the combination of the size of input VC 504-1 and of input VC 504-2, it may not provide optimal efficiency, and bandwidth available at output VC 506 may not be fully utilized, thereby reducing the overall throughput of the NoC component. In an example implementation, in order to improve the throughput of the NoC component 502-1, input VCs 504-1 and/or VC 504-2 can be upsized from 64 bits to 128 bits to enable reading/sending of packets at 128 bits/cycle. However, in spite of this, the output VC 506 may not be fully utilized as the input channels may not receive more than 64 bits per cycle from the previous NoC component 502-2, which has narrower VC widths of 64 bits.

In an example implementation, input VCs 504 can have associated buffers such as buffer 508-1 that is associated with input channel 504-1, and buffer 508-2 that is associated with channel 504-2, both of which are configured to receive/store/forward data from respective input channels to output channel 506. In an example implementation of the present disclosure, in order to optimize the sizing, when a packet is received at input channel say VC 504-1, the NoC component 502-1 can schedule the input VC 504 to buffer the entire packet (may consist of several flits) from start of packet (SOP) to end of packet (EOP) without multiplexing it with packets of other input VC say VC 504-2, and then send the packet from the buffer 508 to the output VC 506 when the complete packet is buffered or when the buffer is full. A channel having such a configuration can be referred to as store and forward channel, wherein the complete packet is stored/buffered before being forwarded to the output channel. In case however, if the buffer is full, the already buffered part of the packet can be sent, during which time, the remaining part of the packet can be buffered for subsequent issuance. According to one embodiment, such buffers 508 can be dynamically sized buffers.

According to one embodiment, in order to better utilize the wide bandwidth output VC 506, data from input VC, example input VC 504-2, can be stored in dynamic sized buffer for two cycles, and then forwarded together in the next cycle. However in such an implementation, the output VC channel 506 remains utilized half of the time. At one cycle, the output VC 506 may forward 128 bits, however in the second cycle, the output VC 506 remains idle. Similarly, in the third cycle, the output VC 506 may forward 128 bits and remain idle in the fourth cycle. Therefore, the net bandwidth utilization of output VC 506 by NoC component 502-1 is only 50% as the output VC 506 remains idle half the time, wherein in order to further improve utilization of the wide output VC 506 and to get maximum throughput from the NoC component 502-1, NoC channel arbitration algorithm can be designed in such a way that when NoC component 502-1 has multiple narrow channels and one wide channel, in an example implementation, such traffic behavior (multiple narrow input VC and single narrow output VC) can be automatically detected and size of the input channels VC 504-1, VC 504-2 and/or size of the input buffers 508-1, 508-2 can be upsized, say from 64 to 128 bits/cycle.

FIG. 5B illustrates another example NoC component 552 that has a wide input channel, and two narrow output channels that can use automatic sizing of channels and/or buffers thereof in accordance with an embodiment of the present disclosure. As illustrated, NoC component 552 can have one wide input channel 554 of 128 bits/cycle, and two output channels VC 556-1 and VC 556-2, collectively referred to as output channel(s) 556 hereinafter, of 64 bits each. In an example implementation, where multiplexing/de-multiplexing of packets of two input/output VCs are not allowed, throughput of the NoC component 552-1 may not be optimal. For instance, NoC component 552-1 may receive flits/cycle at 128 bit per cycle but will only be able to forward flits/cycle at 64 bit per cycle through its output VC 556-1 and/or output VC 556-2, thereby enabling drop in the throughput.

In an example implementation, throughout of the NoC component 502-1 can be improved by automatically upsizing the width of the respective output channels 556 from 64 bits to 128 bits/cycle. In an example implementation, such traffic behavior (single wide input VC and multiple narrow output VCs) can be automatically detected, and size of the output channels and/or its output buffers 558-1 and 558-2 can be upsized to meet the efficiency requirements. In an embodiment, other NoC components such as NoC component 552-2 and NoC component 552-3 can be similarly optimized.

In an example embodiment, size of input/output buffer and/or input/output VCs can be automatically upsized or downsized based on one or more performance objectives, throughputs of input virtual channels, and throughout of output virtual channels. In an embodiment, throughput of the input virtual channels and of the output virtual channels can be based on and/or can be derived from one or more of clock frequencies of channels, channel width, rate of traffic, and given traffic specification of the NoC and SoC. According to an embodiment, the performance objective can include one or a combination of rate of traffic, message size, distribution of message size or channel width, channel clock frequency, arbitration efficiency of the NoC components, traffic burstiness, user-specified over provisioning, among other like parameters/attributes. In another embodiment, the buffer size can be adjusted based on flow control turnaround time between a transmitting hardware element and a receiving hardware element.

FIG. 5C illustrates example NoC components 572 and 574, wherein size of buffer and data forwarding can be based on flow control in accordance with an embodiment of the present disclosure. As illustrated, two NoC components such as router 572 and 574 of a NoC interconnect can resize buffers of their VCs based on block control. In example implementation, all ports and respective VCs of the NoC components maintain a credit update and forward the data based on available credit. In an example implementation, when a router 572 sends data to router 574 over its VC 576, router 574 can send back a credit through its VC 576 to the router 572 after forwarding the packets through the output VC of the router 574. When the router 572 sends data, it may decrement its credit and when it receives credit from router 574, it may increment its credit value. Such implementation can add latency to the system architecture as the next set of flits may have to wait till credit is received back from the router 574. In such an implementation, buffer size can be increased or decreased to match the turnaround time from data transmission to credit return, to maintain full throughput. For instance, if the turnaround time is X cycle, output buffer 576 can be resized at X flits such that the output VC 576 of the router 572 has enough time to receive the credit and to store flits received during that time period. In an example, size of buffer can be proportional to the flow control turnaround time and required throughput at the VC.

In an embodiment, buffer size can be adjusted based on clock frequencies of the NoC components involved in the transaction. Aspects of the present system further include means for sizing a channel based on flow control, wherein, for instance, in case it is determined by the proposed system that the router sending a request works at a different clock frequency (C1) when compared with the clock frequency (C2) of the receiving router, as the router times are different, buffer size of the receiving buffers can be controlled/managed to enable efficient throughput. In another example aspect, in case the proposed system determines that the read frequency is less than write frequency, there exists no need to maintain full throughput by means of additional buffer size as the read throughput is more than the write throughput and the drain rate at the VC buffer would be lower. On the other hand, in case the read frequency is more than or equal to the write frequency, the VC buffer size can be deepened.

In an embodiment on the above-mentioned lines therefore, size of channel buffer can also be dependent on whether the transmitting hardware element(s) and the receiving hardware element(s) are operating at synchronous clock cycle. For such scenario, buffer can also be sized to store the data received during to time period required to shift from one clock domain to another clock domain as the NoC component may incur some latency in time taken to change from one clock domain to another. When two hardware elements engaged in communication are of different clock domains, buffer sizes can be increased to accommodate such latency.

In an example implementation, size of the buffer can be calculated based on one or a combination of bandwidth requirement, required performance objectives, frequency of transmitting hardware elements and receiving hardware elements, turnaround time in case of credit based packet forwarding. Calculation of buffer size can also include parameters, including but not limited to, possibility of randomness/burstiness. In yet another example implementation, buffer can be sized to store X back to back flits in case on bursty traffic behavior, wherein X is the number derived from estimation of past bursty behavior.

In an example implementation, for a very large packet, the input buffer can be resized to store enough part of the packet and then start forwarding the data from buffer such that by the time first set of data is transmitted from the buffer to the output VC, remaining portion of the data of the packet arrives at the buffer. In an instance of a NoC component having a narrow input channel of 64 bits/cycle, wide output channel of 128 bits/cycle, and each packet having a size of 16*64 bits (i.e. 16 flits), the buffer can be sized to store 11*64 bits at a given time such that by the time by the 10th FLIT is transmitted from the buffer to the output channel, remaining part of the packet arrives at the buffer or is already buffered. One should appreciate that even through the buffer may be small sized when compared with the full length of packet to be transmitted, it may have the same throughout as it can be sized to store enough parts of packet so that the performance is not hampered. In an example implementation, size of buffer can be a function of the input data rate, output data rate, and one or more defined performance objectives, i.e., buffer size=F(input data rate, output data rate, performance objectives/parameters).

Figure 6:
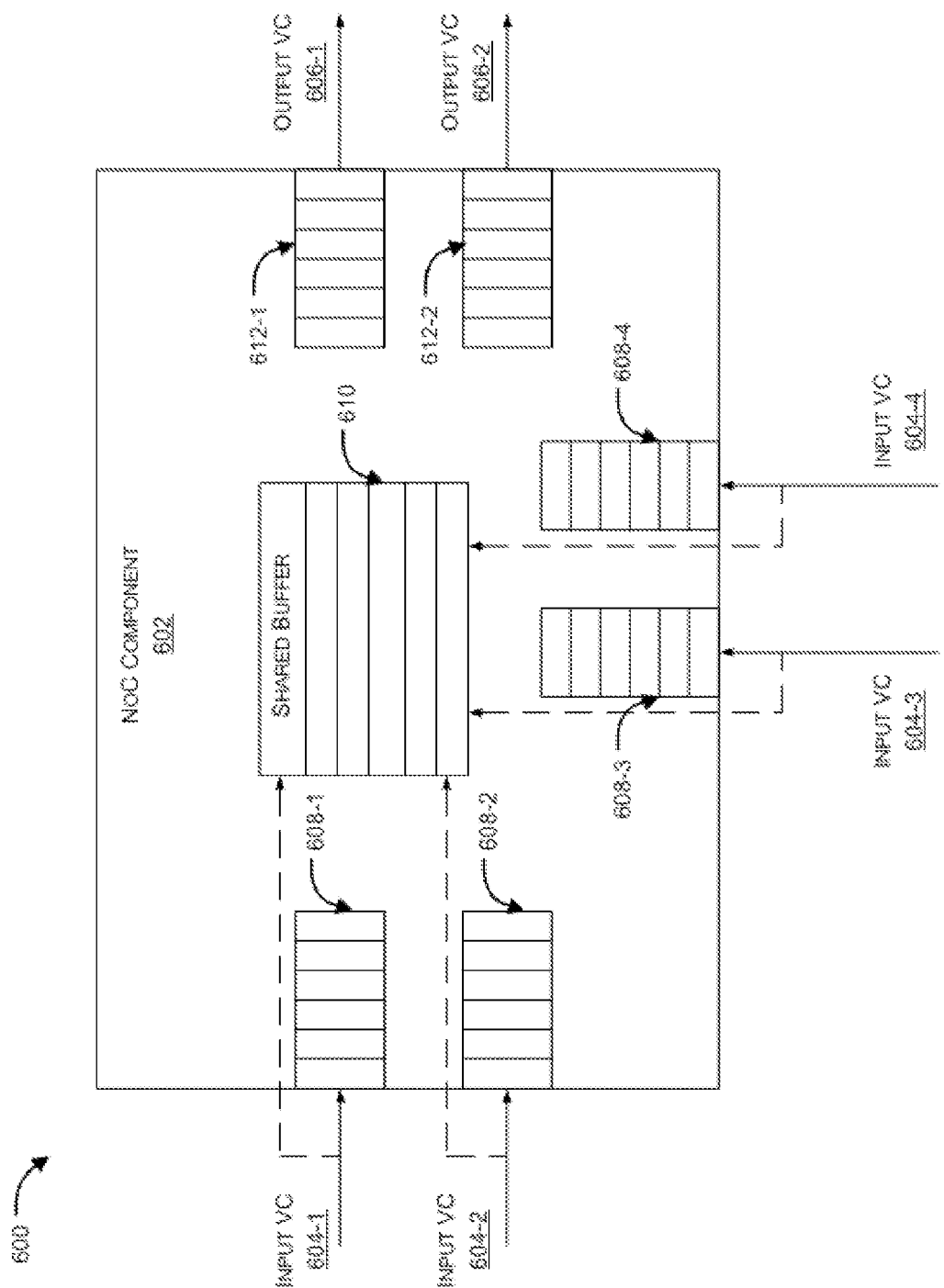
FIG. 6 illustrated a shared buffer for input VC of NoC component in accordance with an embodiment of the present disclosure.

FIG. 6 illustrates a shared buffer architecture for input channel of NoC component in accordance with an embodiment of the present disclosure. As illustrated in FIG. 6, NoC component 602 can have 4 input channels such as 604-1, 604-2, 604-3, and 604-4, collectively and interchangeably referred as input VCs 604 hereinafter, and 2 output channels such as 606-1 and 606-2, collectively and interchangeably referred as output VC 606 hereinafter. NoC component 602 can further include dedicated input buffers such as 608-1, 608-2, 608-3, and 608-4 respectively for each input VC 604, output buffers such as 612-1 and 612-2 for respective output VCs 606, and a shared buffer 610. In an example implementation of the present disclosure, instead of assigning dedicated buffers 608 of large sizes for each input VC 404, system of the present disclosure can configure a shared buffer 610 that can be accessed by any input VC 604 in order to buffer its flits that are to be read out from the output VCs 606. In an example implementation, shared buffer 610 can be dynamically and/or automatically be shared and partitioned between input VCs 604. In another embodiment, a selective set of input VC's can also be configured to use the shared buffer 610 instead of allowing all the input VCs to use the buffer 610. In yet another embodiment, instead of or apart from the input VCs, output VC's can also be configured to use one or more shared buffer configurations.

In another example embodiment, if it is determined that an input buffer does not have the capability to store the entire packet, clock frequency of the corresponding input channel can be lowered to enable slow transmission of data, in which case the same configuration can be applied, wherein the input VC can lock with an output VC and keep sending the complete packet in a single go itself.

In another embodiment, channel/buffer optimizations can also cater for bursty traffic behavior, which may typically be slow but sometimes may encounter back-to-back traffic on a given VC channel, in which case, the channel may not have the capability to handle the burstiness. Therefore, aspects of the present disclosure can include a metric that defines how much burstiness can be handled by a channel or by multiple channels, and how many back to back packets of the same flow may need to be handled. For instance, if 3 back-to-back packets need to be handled, the same can be recorded as a constraint, and the FIFO buffers can be resized accordingly. Therefore, in total, instead of 1, a total of 4 packets (including 3 back-to-back packets) may need to be handled and therefore the buffers can be resized accordingly by creating additional buffer space.

Figure 7:
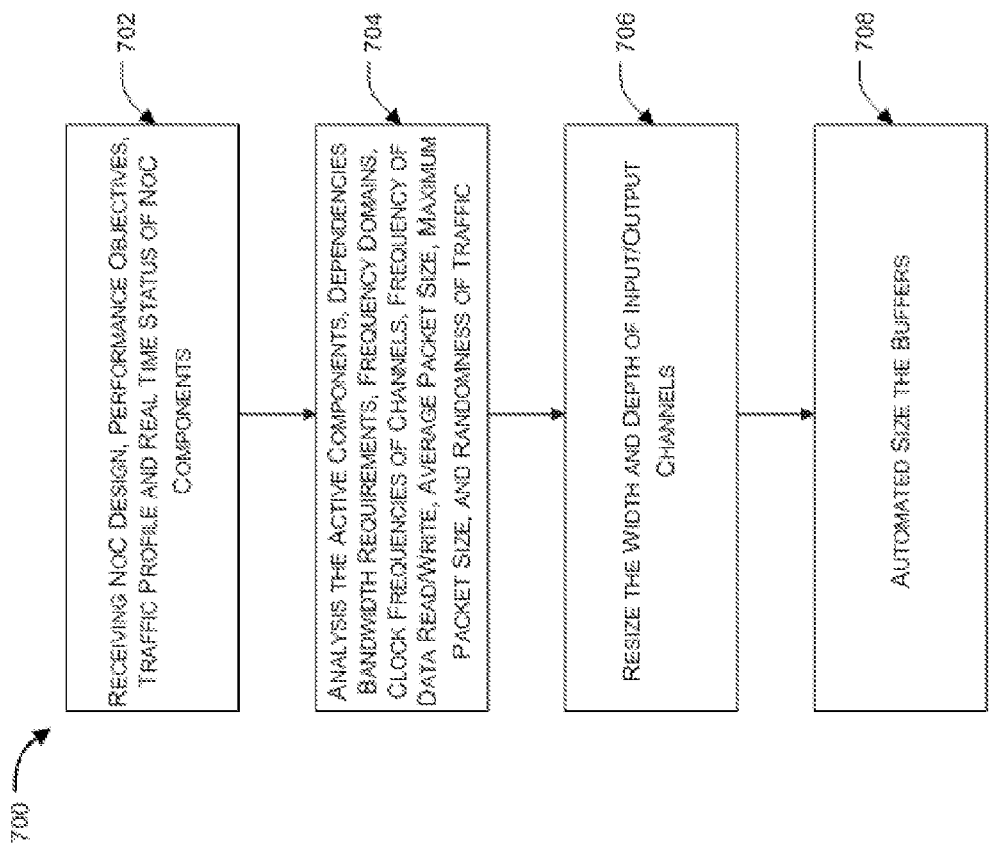
FIG. 7 illustrates a flow chart for automatic sizing of input channel, sizing of output channel and sizing of buffers in accordance with an embodiment of the present disclosure.

FIG. 7 illustrates an example flow diagram 700 for automatically sizing of buffers of input/output channel(s) in accordance with an embodiment of the present disclosure. At step 702, load/bandwidth and performance objectives expected to be handled by a channel can be computed based on one or a combination traffic flows on the channel, rate of each flow, size of each message in each flow, distribution pattern of each message, current width of the channel, clock frequency of the channel, among other like parameters. At step 704, based on the computed load/bandwidth and performance objectives of this channel and of the upstream channels to which this channel sends data, and of the downstream channels from which this channel receives data, the channel and/or buffers thereof can be sized in terms of their width and depth so as to meet the load/bandwidth and performance objectives.

Figure 8:
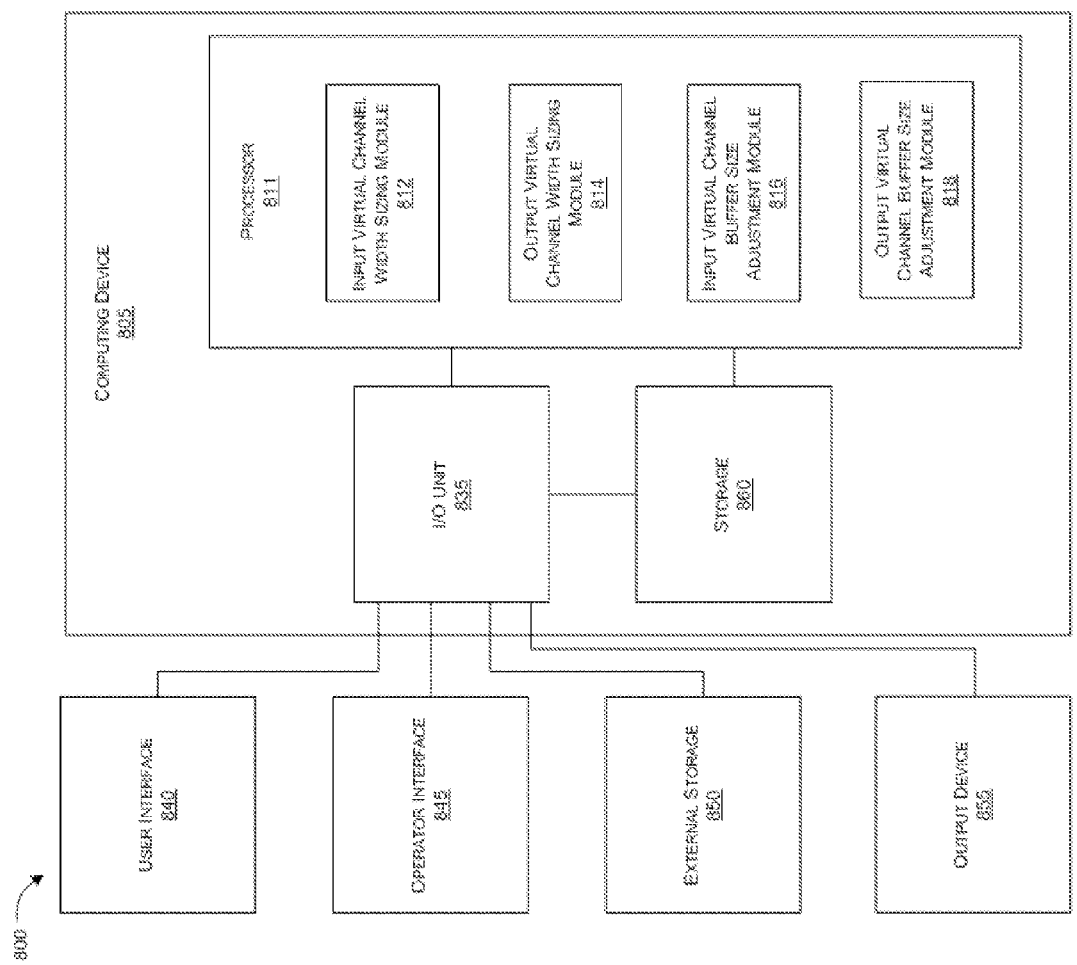
FIG. 8 illustrates an example computer system on which example implementations may be implemented.

FIG. 8 illustrates an example computer system 800 on which example implementations may be implemented. The computer system 800 includes a server 805 which may involve an I/O unit 835, storage 860, and a processor 810 operable to execute one or more units as known to one of skill in the art. The term "computer-readable medium" as used herein refers to any medium that participates in providing instructions to processor 810 for execution, which may come in the form of computer readable storage mediums, such as, but not limited to optical disks, magnetic disks, read-only memories, random access memories, solid state devices and drives, or any other types of tangible media suitable for storing electronic information, or computer readable signal mediums, which can include media such as carrier waves. The I/O unit processes input from user interfaces 840 and operator interfaces 845 which may utilize input devices such as a keyboard, mouse, touch device, or verbal command.

The server 805 may also be connected to an external storage 850, which can contain removable storage such as a portable hard drive, optical media (CD or DVD), disk media or any other medium from which a computer can read executable code. The server may also be connected an output device 855, such as a display to output data and other information to a user, as well as request additional information from a user. The connections from the server 805 to the user interface 840, the operator interface 845, the external storage 850, and the output device 855 may via wireless protocols, such as the 802.11 standards, Bluetooth® or cellular protocols, or via physical transmission media, such as cables or fiber optics. The output device 855 may therefore further act as an input device for interacting with a user.

The processor 810 may execute one or more modules. System 800 can include a processor operatively coupled with a memory and with a hardware element having an input port associated with an input virtual channel and an associated output port associated with an output virtual channel, wherein the system can include an input virtual channel width sizing module 812 configured to size a width of the input virtual channel based on a performance objective and a throughput of at least one of the input virtual channel and output virtual channel. System 800 can further include an output virtual channel width sizing module 814 configured to size a width of the output virtual channel based on the performance objective and a throughput at least one of the output virtual channel and input virtual channel. System 800 can further include a input virtual channel buffer size adjustment module 816 configured to adjust a buffer size of a buffer associated with the input virtual channel based on the performance objective and the throughput of at least one of the input virtual channel and output virtual channel. System 800 can further include an output virtual channel buffer size adjustment module 818 configured to adjust a buffer size of a buffer associated with the output virtual channel based on the performance objective and the throughput of the at least one of the output virtual channel and input virtual channel. In an aspect of the proposed system 800, throughput of the input virtual channel and the output virtual channel can be derived from one or more of clock frequency, channel width and traffic specification. In another aspect, performance objective can be based on at least one of rate of traffic, message size distribution of the traffic, channel width, channel clock frequency, arbitration efficiency of the router, traffic burstiness, and specified overprovisioning. In yet another aspect of the proposed system 800, adjustment of the buffer size can include adjustment of the buffer size based on the performance objective, and input/output message sizes and input/output message rate. In yet another aspect of the proposed system 800, adjustment of the buffer size can be based on a flow control turnaround time between a transmitting hardware element and a receiving hardware element. In yet another aspect, adjustment of the buffer size can be based on a clock frequency of a transmitting hardware element and a receiving hardware element. As also mentioned above, hardware element can be any or a combination of a router and a bridge or any other NoC element.

In some example implementations, the computer system 800 can be implemented in a computing environment such as a cloud. Such a computing environment can include the computer system 800 being implemented as or communicatively connected to one or more other devices by a network and also connected to one or more storage devices. Such devices can include movable user equipment (UE) (e.g., smartphones, devices in vehicles and other machines, devices carried by humans and animals, and the like), mobile devices (e.g., tablets, notebooks, laptops, personal computers, portable televisions, radios, and the like), and devices designed for stationary use (e.g., desktop computers, other computers, information kiosks, televisions with one or more processors embedded therein and/or coupled thereto, radios, and the like).

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present disclosure. Further, some example implementations of the present disclosure may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present disclosure will be apparent to those skilled in the art from consideration of the specification and practice of the teachings of the present disclosure. Various aspects and/or components of the described example implementations may be used singly or in any combination. It is intended that the specification and example implementations be considered as examples only, with the true scope and spirit of the present disclosure being indicated by the following claims.

What is claimed is:

1. A method for generating a Network on Chip (NoC), comprising:
   generating the NoC comprising a hardware element having an input port associated with an input virtual channel and an associated output port associated with an output virtual channel, the generating the NoC comprising:
sizing a width of the input virtual channel based on a performance objective and a throughput of at least one of the input virtual channel and output virtual channel;
sizing a width of the output virtual channel based on the performance objective and a throughput at least one of the output virtual channel and input virtual channel; and
adjusting a buffer size of a buffer associated with the input virtual channel based on the performance objective and the throughput of at least one of the input virtual channel and output virtual channel;
adjusting a buffer size of a buffer associated with the output virtual channel based on the performance objective and the throughput of the at least one of the output virtual channel and input virtual channel;
wherein the hardware element is one of a router and a bridge.

2. The method of claim 1, wherein the throughput of the input virtual channel and the output virtual channel is derived from one or more of: clock frequency, channel width and traffic specification.

3. The method of claim 1, wherein the performance objective is based on at least one of: rate of traffic, message size distribution of the traffic, channel width, channel clock frequency, arbitration efficiency of the router, traffic burstiness, and specified overprovisioning.

4. The method of claim 1, wherein the adjusting the buffer size comprises adjusting the buffer size based on the performance objective, and input/output message sizes and input/output message rate.

5. The method of claim 1, wherein the adjusting the buffer size is based on a flow control turnaround time between a transmitting hardware element and a receiving hardware element.

6. The method of claim 1, wherein the adjusting the buffer size is based on a clock frequency of a transmitting hardware element and a receiving hardware element.

7. A non-transitory computer readable medium storing instructions for executing a process for generating a Network on Chip (NoC), the instructions comprising:
generating the NoC comprising a hardware element having an input port associated with an input virtual channel and an associated output port associated with an output virtual channel, the generating the NoC comprising:
sizing a width of the input virtual channel based on a performance objective and a throughput of at least one of the input virtual channel and output virtual channel;
sizing a width of the output virtual channel based on the performance objective and a throughput at least one of the output virtual channel and input virtual channel; and
adjusting a buffer size of a buffer associated with the input virtual channel based on the performance objective and the throughput of at least one of the input virtual channel and output virtual channel;
adjusting a buffer size of a buffer associated with the output virtual channel based on the performance objective and the throughput of the at least one of the output virtual channel and input virtual channel;
wherein the hardware element is one of a router and a bridge.

8. The non-transitory computer readable medium of claim 7, wherein the throughput of the input virtual channel and the output virtual channel is derived from one or more of: clock frequency, channel width and traffic specification.

9. The non-transitory computer readable medium of claim 7, wherein the performance objective is based on at least one of: rate of traffic, message size distribution of the traffic, channel width, channel clock frequency, arbitration efficiency of the router, traffic burstiness, and specified overprovisioning.

10. The non-transitory computer readable medium of claim 7, wherein the adjusting the buffer size comprises adjusting the buffer size based on the performance objective, and input/output message sizes and input/output message rate.

11. The non-transitory computer readable medium of claim 7, wherein the adjusting the buffer size is based on a flow control turnaround time between a transmitting hardware element and a receiving hardware element.

12. The non-transitory computer readable medium of claim 7, wherein the adjusting the buffer size is based on a clock frequency of a transmitting hardware element and a receiving hardware element.

13. A system configured to generate a Network on Chip (NoC), comprising:
a processor operatively coupled with a memory and configured to generate a NoC comprising a hardware element having an input port associated with an input virtual channel and an associated output port associated with an output virtual channel and to execute each module in the memory, said memory comprising:
an input virtual channel width sizing module configured to size a width of the input virtual channel based on a performance objective and a throughput of at least one of the input virtual channel and output virtual channel;
an output virtual channel width sizing module configured to size a width of the output virtual channel based on the performance objective and a throughput at least one of the output virtual channel and input virtual channel;
input virtual channel buffer size adjustment module configured to adjust a buffer size of a buffer associated with the input virtual channel based on the performance objective and the throughput of at least one of the input virtual channel and output virtual channel; and
an output virtual channel buffer size adjustment module configured to adjust a buffer size of a buffer associated with the output virtual channel based on the performance objective and the throughput of the at least one of the output virtual channel and input virtual channel;
wherein the hardware element is one of a router and a bridge.

14. The system of claim 13, wherein the throughput of the input virtual channel and the output virtual channel is derived from one or more of: clock frequency, channel width and traffic specification.

15. The system of claim 13, wherein the performance objective is based on at least one of: rate of traffic, message size distribution of the traffic, channel width, channel clock frequency, arbitration efficiency of the router, traffic burstiness, and specified overprovisioning.

16. The system of claim 13, wherein adjustment of the buffer size comprises adjustment of the buffer size based on the performance objective, and input/output message sizes and input/output message rate.

17. The system of claim 13, wherein adjustment of the buffer size is based on a flow control turnaround time between a transmitting hardware element and a receiving hardware element.

18. The system of claim 13, wherein adjustment of the buffer size is based on a clock frequency of a transmitting hardware element and a receiving hardware element.

\* \* \* \* \*